United States Patent
Tan et al.

(10) Patent No.: US 11,150,748 B1
(45) Date of Patent: Oct. 19, 2021

(54) MOUSE DEVICE AND METHOD FOR CALIBRATING SENSITIVITY THEREOF

(71) Applicant: PIXART IMAGING INC., Hsin-Chu (TW)

(72) Inventors: Zi-Hao Tan, Penang (MY); Willie Song, Penang (MY)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 16/896,698

(22) Filed: Jun. 9, 2020

(51) Int. Cl.
 *G06F 3/0354* (2013.01)
 *G06F 3/039* (2013.01)

(52) U.S. Cl.
 CPC ........ *G06F 3/03543* (2013.01); *G06F 3/0395* (2013.01)

(58) Field of Classification Search
 CPC ............................ G06F 3/03543; G06F 3/0395
 USPC ......................................................... 345/156
 See application file for complete search history.

(56) References Cited

U.S. PATENT DOCUMENTS

| | | | | |
|---|---|---|---|---|
| 8,825,423 B1* | 9/2014 | Brovoid | ................... | G01N 3/62 |
| | | | | 702/85 |
| 2005/0001817 A1* | 1/2005 | Lauffenburger | ...... | G06F 1/3259 |
| | | | | 345/166 |
| 2008/0007526 A1* | 1/2008 | Xu | ......................... | G06F 3/0317 |
| | | | | 345/163 |
| 2011/0032539 A1* | 2/2011 | Chang | ................... | G06F 3/0317 |
| | | | | 356/614 |

* cited by examiner

*Primary Examiner* — Mark Edwards
(74) *Attorney, Agent, or Firm* — Li & Cai Intellectual Property (USA) Office (57) ABSTRACT

A mouse device and method for calibrating sensitivity thereof are provided. The method for calibrating sensitivity includes the following steps. First, sampling information is obtained under a test mode. A calibration factor is obtained according to the sampling information and a preset value. The calibration factor can be obtained by dividing the preset value by the resolution. Under a normal mode, an actual count detected by the mouse device is calibrated according to the calibration factor. Whenever the mouse device is moved on the operating surface for a distance, the actual count detected by the mouse device can be calibrated to obtain a calibrated count. The calibrated count can be calculated by multiplying the actual count by the calibration factor.

21 Claims, 6 Drawing Sheets

MOUSE DEVICE AND METHOD FOR CALIBRATING SENSITIVITY THEREOF

FIELD OF THE DISCLOSURE

The present disclosure relates to an input device and a method for calibrating sensitivity thereof, and more particularly to a mouse device and method for calibrating sensitivity thereof.

BACKGROUND OF THE DISCLOSURE

Conventionally, an optical mouse may output movement information with a DPI (dots per inch) value to a host, so that the host can control a cursor shown on a display device according to the movement information. The DPI value means the dots reported from the conventional optical mouse to the host when the conventional optical mouse is moved one inch on a surface.

Since reported count or the DPI value of the conventional optical mouse may deviate from its preset value due to fabrication process variation or assembly tolerances, the conventional optical mouse would be calibrated based on a preset value before the conventional optical mouse leaves the factory.

However, even though the conventional optical mouse has been calibrated before leaving the factory, the reported count or the DPI value would still deviate from the preset value at a user end since the conventional optical mouse may be placed and operated on a surface, such as a mouse map, a paper, or a desk, that usually has different surface roughness from that of the surface for calibration. Such DPI variation may therefore be a source of annoyance for the user during operation.

In some operating systems the DPI value can be manually adjusted by the user. However, since it is difficult for the user to detect a variation between the reported count or the DPI value and the preset value, the DPI value of the conventional optical mouse cannot be adjusted by the user to satisfy the preset value.

SUMMARY OF THE DISCLOSURE

In response to the above-referenced technical inadequacies, the present disclosure provides a mouse device and a method for calibrating sensitivity thereof at a user end.

In one aspect, the present disclosure provides a method for calibrating mouse device sensitivity at a user end. First sampling information of the mouse device is obtained by moving the mouse device on a first operating surface to be used. The first sampling information includes a first directional resolution in a first direction. A preset value is retrieved from a memory. A first directional calibration factor corresponding to the first operating surface is obtained by dividing the preset value by the first directional resolution. A first actual output count of the mouse device corresponding to the first direction is calibrated by multiplying the first actual count by the first directional calibration factor so as to obtain a first directional calibrated count when the mouse device is used on the first operating surface.

In one aspect, the present disclosure provides a method for calibrating sensitivity of a mouse device at a user end. A first total count is detected by placing the mouse device on an operating surface to be used and moving the mouse device for a first predetermined distance along a first direction. A second total count is detected by placing the mouse device on the operating surface to be used and moving the mouse device for a second predetermined distance along a second direction. Sampling information is obtained according to the first total count, the second total count, the first predetermined distance, and the second predetermined distance. The sampling information includes a sampling resolution that is calculated based on an equation: $SR=(N1+N2)/(d1+d2)$, in which SR represents the sampling resolution, N1 represents the first total count, N2 represents the second total count, d1 represents the first predetermined distance, and d2 represents the second predetermined distance. A preset value is retrieved from a memory. A calibration factor is obtained by dividing the preset value by the sampling resolution. When the mouse device is used on the operating surface, a first actual count detected by the mouse device corresponding to the first direction is calibrated by multiplying the first actual resolution by the calibration factor so as to obtain a first directional calibrated count.

In one aspect, the present disclosure provides a mouse device capable of calibrating sensitivity thereof. The mouse device includes a memory, an optical sensor, and a processor. The memory stores a preset value, and the optical sensor is configured to obtain sampling information when the mouse device is moved on an operating surface under a test mode. The processor is electrically connected to the memory and the optical sensor. The processor calculates at least one calibration factor according to the preset value and the sampling information. Under a normal mode, the processor calibrates an actual count by multiplying the actual count by the calibration factor, and outputs a calibrated count when the mouse device is used on the operating surface.

Therefore, one of the advantages of the present disclosure is that in the mouse device and the method for calibrating sensitivity thereof at a user end provided herein, by the technical features of "obtaining a first sampling information of the mouse device by moving the mouse device on a first operating surface to be used," "obtaining a first directional calibration factor corresponding to the first operating surface by dividing the preset value by the first directional resolution," and "calibrating a first actual count of the mouse device corresponding to the first direction by multiplying the first actual count by the first directional calibration factor so as to obtain a first directional calibrated count when the mouse device is used on the first operating surface," the sensitivity of the mouse device can be easily calibrated by a user whenever the operating surface on which the mouse device is placed is changed. That is to say, by the method for calibrating the mouse device disclosed herein, the user could avoid annoyances caused by the DPI variations resulting from different operating surfaces with different surface roughness.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
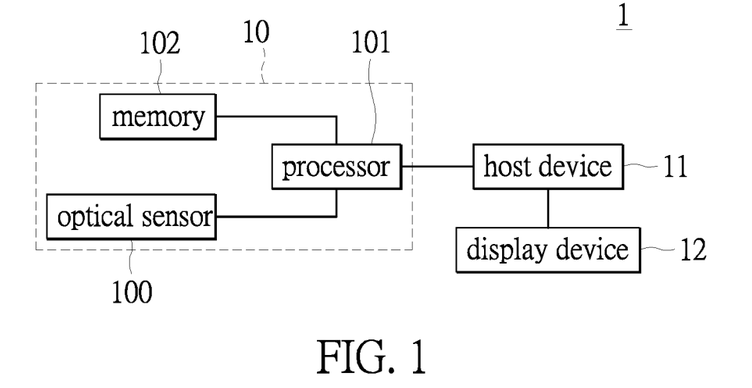
FIG. 1 is a functional block diagram of a mouse device that is electrically connected to a host device in an operation system according to an embodiment of the present disclosure.
Figure 2:
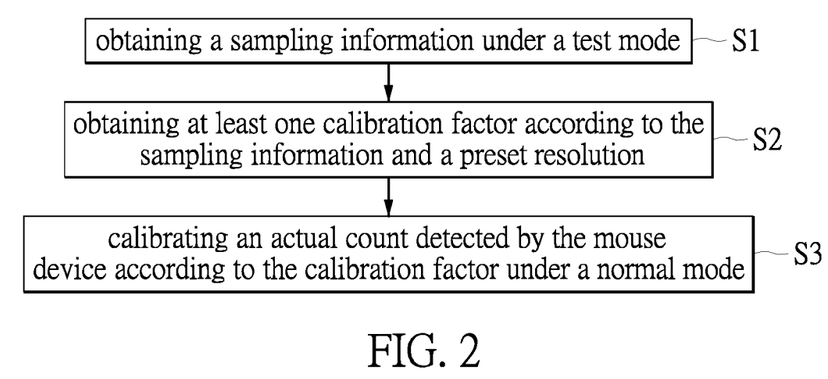
FIG. 2 is a flowchart of a method for calibrating sensitivity of a mouse device at a user end according to a first embodiment of the present disclosure.

Reference is made to FIG. 1 and FIG. 2. FIG. 1 is a functional block diagram of a mouse device that is electrically connected to a host device in an operation system according to an embodiment of the present disclosure, and FIG. 2 is a flowchart of a method for calibrating sensitivity of a mouse device at a user end according to a first embodiment of the present disclosure.

As shown in FIG. 1, an operation system 1 includes a mouse device 10, a host device 11, and a display device 12. The mouse device 10 and the display device 12 are both electrically connected to a host device 11. A user can control the movement of a cursor displayed on the display device 12 through moving the mouse device 10.

Specifically, the mouse device 10 includes an optical sensor 100 and a processor 101 electrically connected to the optical sensor 100. When the mouse device 10 is placed on an operating surface and moved for a distance, the optical sensor 100 is configured to capture a plurality of surface images of the operating surface. The operating surface may be a surface of a mouse pad, a desk, a paper, or any object. The processor 101 receives the surface images from the optical sensor 100 and obtains the count (of pixels) that corresponds to the movement distance of the mouse device 10 according to the surface images.

Since the mouse device 10 may be placed on different operating surfaces to be used, the sensitivity of the mouse device 10 would be changed. In order to ensure the sensitivity of the mouse device 10 is maintained at substantially the same level no matter which operating surface the mouse device 10 is placed on, a CPI/DPI value or the reported count of the mouse device 10 would need to be calibrated.

In the instant embodiment, the optical sensor 100 is configured to obtain sampling information when the mouse device 10 is moved on the operating surface under a test mode. The details of obtaining the sampling information will be described in the following description and will not be reiterated herein.

The mouse device 10 further includes a memory 102 that stores a preset value. The preset value may correspond to a desired DPI/CPI or reported count. The processor 101 can retrieve the preset value from the memory 102 to calculate a calibration factor according to the preset value and the sampling information. Furthermore, under a normal mode, the processor 101 calibrates an actual count by multiplying the actual count by the calibration factor. In one embodiment, the processor 101 outputs a calibrated count when the mouse device 10 is used on the operating surface.

In another embodiment, the processor 101 transmits the actual count (or the actual CPI/DPI value) and the calibration factor to the host device 11. The host device 11 calibrates the actual count by multiplying the actual count (or the actual CPI/DPI value) by the calibration factor through executing an application program. The host device 11 controls the movement of the cursor shown on the display device 12 according to the calibrated count (or the calibrated CPI/DPI value).

Reference is made to FIG. 2. The method shown in FIG. 2 can be executed by the operating system 1 shown in FIG. 1. It should be noted that in the present disclosure, by calibrating the CPI/DPI value or the count reported by the mouse device 10, the sensitivity of the mouse device 10 can be calibrated at the user end to satisfy a condition that has been preset before the mouse device 10 left the factory.

That is, the method for calibrating sensitivity of the mouse device 10 can be performed, so that the actual CPI/DPI value or the actual count reported by the mouse device 10 can be calibrated when the mouse device 10 is operated on a certain operating surface.

In the instant embodiment, the method for calibrating sensitivity of the mouse device at a user end includes the following steps. In step S1, the sampling information is obtained under a test mode. To be more specific, the mouse device 10 can be switched to the test mode so as to obtain the sampling information. The sampling information may include a resolution that may correspond to a certain direction.

In step S2, a calibration factor is obtained according to the sampling information and a preset value. The calibration factor can be obtained by dividing the preset value by the resolution. It should be noted that both the sampling information and calibration factor correspond to the certain operating surface. That is to say, different operating surfaces may respectively correspond to different calibration factors and different sampling information. Furthermore, the calibration factor may correspond to the certain direction.

In step S3, under a normal mode, an actual count detected by the mouse device is calibrated according to the calibration factor. Specifically, after the calibration factor is obtained, the mouse device 10 can be switched to the normal mode. Under the normal mode, the mouse device 10 can be operated on the certain operating surface. Whenever the mouse device 10 is moved on the certain operating surface for a certain distance, the optical sensor 100 can detect the actual count corresponding to the certain distance. Thereafter, the processor 101 receives and calibrates the actual count by multiplying the actual count by the calibration factor. The details of each of the steps S1~S3 shown in FIG. 2 and examples will be further described.

Figure 3:
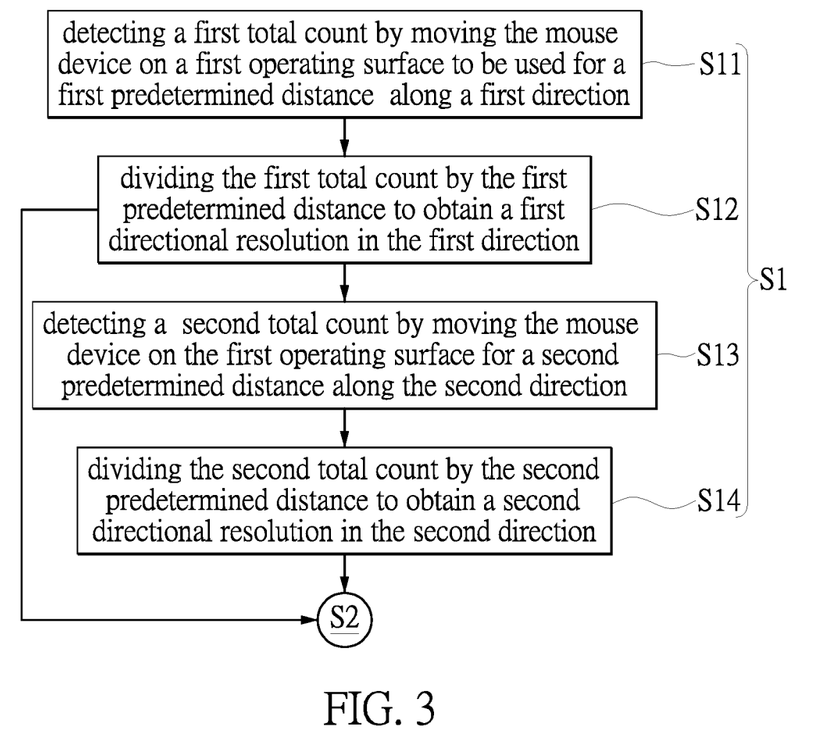
FIG. 3 is a flowchart of the step S1 for obtaining the sampling information shown in FIG. 2 according to an embodiment of the present disclosure.

Reference is made to FIG. 3, which is a flowchart of the step S1 for obtaining the sampling information under the test mode according to an embodiment of the present disclosure.

Specifically, the sampling information includes at least one resolution corresponding to a specific direction. In the instant embodiment, the sampling information includes a first directional resolution in a first direction. The first directional resolution can be obtained by the mouse device 10 shown in FIG. 1. Furthermore, as shown in FIG. 3, the step of obtaining the first directional resolution includes steps S11-S12.

Specifically, in step S11, a first total count is detected by moving the mouse device on the first operating surface to be used for a first predetermined distance along a first direction. In step S12, the first total count is divided by the first predetermined distance to obtain a first directional resolution in the first direction.

Figure 4:
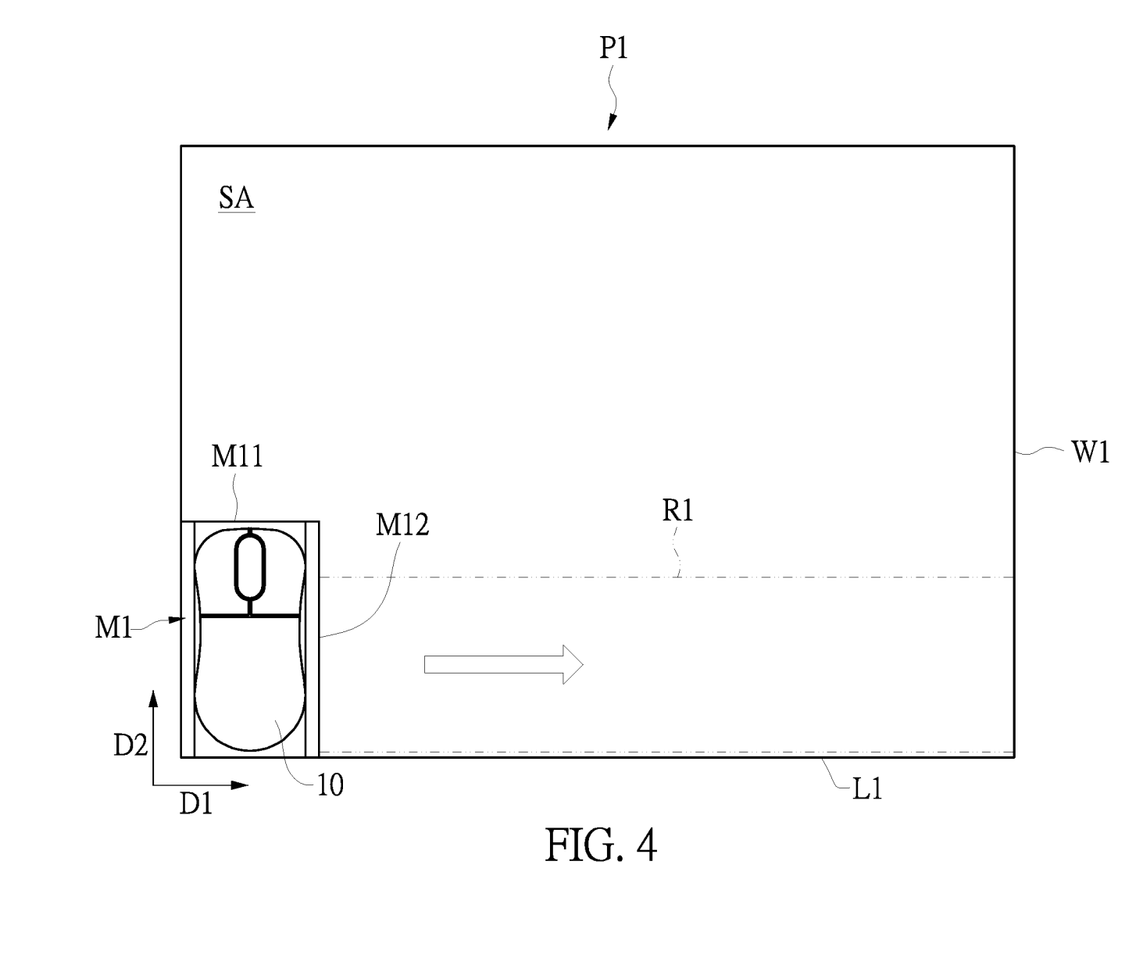
FIG. 4 is a schematic view showing the step for obtaining the first directional resolution in the first direction according to an embodiment of the present disclosure.

Reference is made to FIG. 4, which is to be read in conjunction with FIG. 3. FIG. 4 is a schematic view showing the steps for obtaining the first directional resolution in the first direction according to an embodiment of the present disclosure.

In the instant embodiment, the mouse device 10 is placed on a mouse pad M1 to be used, and the first operating surface SA is a surface of the mouse pad M1. Furthermore, a first direction D1 is a horizontal direction, and a second direction D2 is a vertical direction.

As shown in FIG. 4, the mouse pad M1 has a longer side L1 and a shorter side W1. Furthermore, the mouse pad M1 is arranged with the longer side L1 being substantially parallel to the first direction D1. Accordingly, in order to detect the first total count, the mouse device 10 can be placed on the mouse pad M1 and moved along the longer side L1 of the mouse pad M1 between two opposite shorter sides W1. It should be noted that a longitudinal axis of the mouse device 10, which passes through a front end and a rear end of the mouse device 10, extends in the second direction D2, as the mouse device 10 is moved along the first direction D1.

By moving the mouse device 10 near to the longer side L1 of the mouse pad M1, a first path R1 along which the mouse device 10 travels can be maintained substantially straight and substantially parallel to the first direction D1. That is to say, the longer side L1 of the mouse pad M1 can serve as a baseline. The user may conveniently control the mouse device 10 to move without deviation along the first path R1 in the first direction D1.

It should be noted that if the first path R1 along which the mouse device 10 travels deviates from the first direction D1, the first total count detected by the mouse device 10 would be inaccurate. In addition, the accuracy of the first total count would affect the first directional resolution.

Accordingly, in one embodiment, before a step of detecting the first total count, the mouse device 10 is assembled to a stabilizing member M1. When moved, the mouse device 10 can be held at a certain height above the first operating surface SA by using the stabilizing member M1 to hold the mouse device 10. As such, the accuracy of the first total count detected by the mouse device 10 can be improved.

In one embodiment, the stabilizing member M1 can be a box for packaging the mouse device 10. In other words, the mouse device 10 together with the box can be delivered to a customer.

The box can have an engagement portion, so that the mouse device 10 can be detachably assembled to the box through the engagement portion. For example, the engagement portion can be a recess with a contour that matches the shape of the mouse device 10. Furthermore, when the mouse device 10 is assembled to the box (or the stabilizing member M1), a bottom portion of the mouse device 10 is exposed and faces toward the first operating surface SA, so that the optical sensor 100 can capture the surface images.

In the instant embodiment, the stabilizing member M1 has a first edge M11 and a second edge M12, which are respectively parallel to the first direction D1 and the second direction D2. That is to say, the first edge M11 is parallel to the longer side L1 of the mouse pad P1, and the second edge M12 is parallel to the shorter side W1.

After the mouse device 10 is assembled to the stabilizing member M1, the user may conveniently move the mouse device 10 along the first direction D1. Specifically, the user can hold and move the stabilizing member M1 with the first edge M11 of the stabilizing member M1 being in alignment with the longer side L1 of the mouse pad P1, so that the first path R1 along which the mouse device 10 travels can be maintained substantially straight.

It should be noted that when the user moves the mouse device 10, the movement direction of the mouse device 10 may unavoidably deviate from the first direction D1 due to manual operation, which may affect the accuracy of the first total count detected by the mouse device 10. Accordingly, by using the stabilizing member M1, a deviation of the first path R1 resulting from the manual operation can be reduced, thereby further improving the accuracy of the first total count.

In another embodiment, the stabilizing member M1 can be a jig for holding the mouse device 10 at a certain height above the first operating surface SA. Accordingly, the stabilizing member M1 is not limited to the examples provided herein. In other words, the stabilizing member M1 is an auxiliary tool for calibrating the sensitivity of the mouse device 10. However, in another embodiment, the stabilizing member M1 is optional and can be omitted during the step of detecting the first total count.

In the instant embodiment, the first predetermined distance corresponds to a length of the mouse pad P1 and can be stored in a memory, such as the memory 102 of the mouse device 10 shown in FIG. 1 or a memory of the host device 11.

In one embodiment, the step S12 is executed by the mouse device 10. The processor 101 receives the first total count from the optical sensor 100 and retrieves the first predetermined distance from the memory 102 so as to calculate the first directional resolution in the first direction D1. In another embodiment, the step S12 is executed by the host device 11.

That is to say, the host device 11 receives the first total count from the processor 101 of the mouse device 10 and retrieves the first predetermined distance from the memory thereof so as to calculate the first directional resolution in the first direction D1.

It should be noted that the sampling information of the instant embodiment further includes a second directional resolution. Details of the step of obtaining the second directional resolution are described below. Reference is made to FIG. 3. In step S13, a second total count is detected by moving the mouse device on the first operating surface for a second predetermined distance along the second direction. In step S14, the second total count is divided by the second predetermined distance to obtain the second directional resolution in the second direction.

Figure 5:
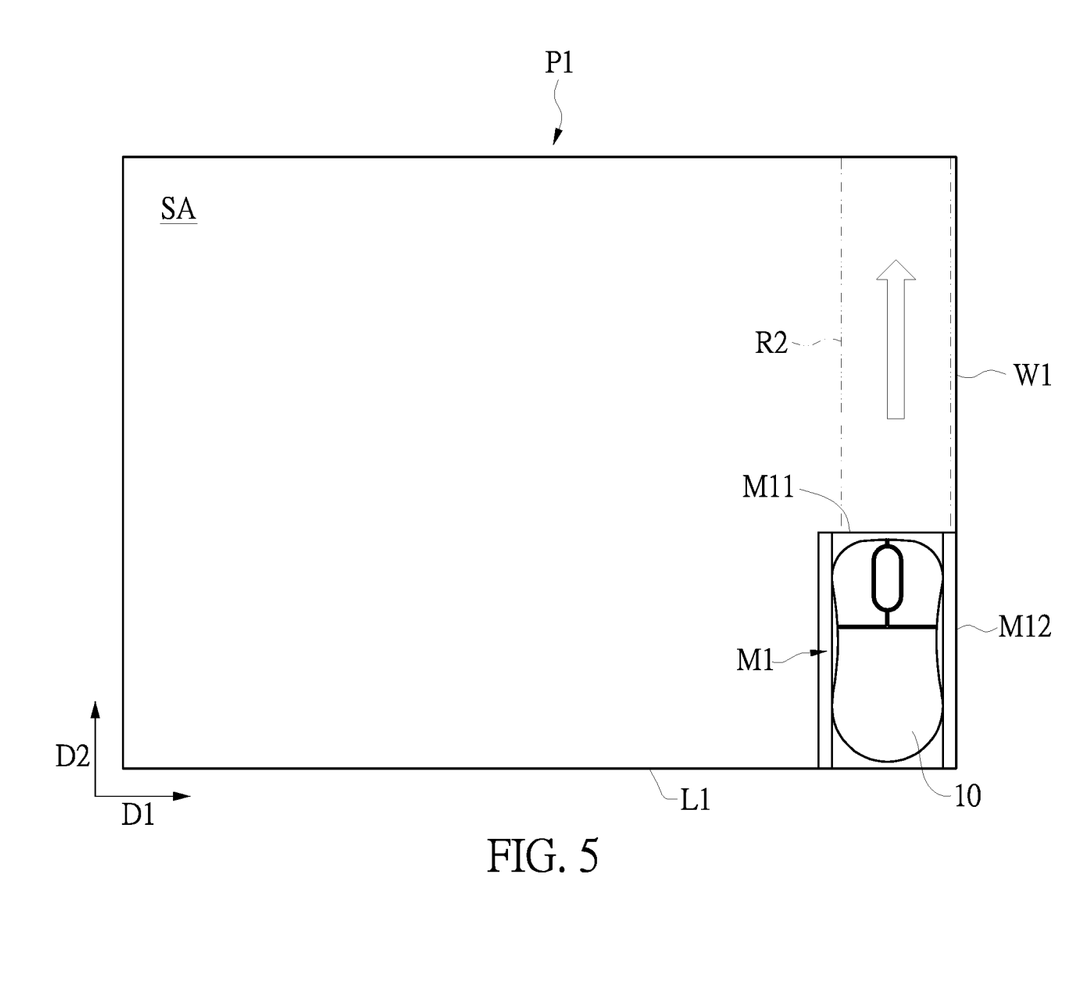
FIG. 5 is a schematic view showing the step for obtaining the second directional resolution in the second direction according to an embodiment of the present disclosure.

Reference is made to FIG. 5, which is to be read in conjunction with FIG. 3. FIG. 5 is a schematic view showing the step for obtaining the second directional resolution in the second direction according to an embodiment of the present disclosure.

As shown in FIG. 5, the mouse pad P1 is arranged with the shorter side W1 of the mouse pad M1 being substantially parallel to the second direction D2. Under the test mode, the mouse device 10 can be placed on the mouse pad P1 and moved near to the shorter side W1 of the mouse pad P1 so as to detect the second total count. Specifically, the longitudinal axis of the mouse device 10 extends in the second direction D2, as the mouse device 10 is moved along the shorter side W1.

By moving the mouse device 10 near to the shorter side W1 of the mouse pad M1, a second path R2 along which the mouse device 10 travels can be maintained substantially straight and substantially parallel to the second direction D2. In the instant embodiment, the mouse device 10 is assembled to the stabilizing member M1. As mentioned previously, when moved, the mouse device 10 can be held at a certain height above the first operating surface SA. Furthermore, the stabilizing member M1 can be held and moved by the user with its second edge M12 being in alignment with the shorter side W1 (or the second direction D2), such that the mouse device 10 assembled thereto can be vertically moved on the first operating surface SA. As such, the accuracy of the second total count detected by the mouse device 10 can be improved.

In the instant embodiment, the second predetermined distance corresponds to a width of the mouse pad P1 and can be stored in a memory, such as the memory 102 of the mouse device 10 shown in FIG. 1 or the memory of the host device 11.

It is worth mentioning that different mouse pads may meet different specifications and have different sizes, respectively. The memory 102 can store a plurality of parameters respectively corresponding to different mouse pads with different specifications. Each of the parameters includes the first and second predetermined distances corresponding to a specific mouse pads with a certain specification. Therefore, by executing an application program, the processor 101 or the host device 11 can retrieve one of the parameters corresponding to the specification of the mouse pad to be used from the memory according to the user's selection.

Similar to the step S12, the step S14 can be executed by the mouse device 10 or the host device 11. In one embodiment, the processor 101 or the host device 11 receives the second total count and retrieves the second predetermined distance from the memory so as to calculate the second directional resolution in the second direction D2.

However, it is not necessary to store the first and second predetermined distances in the memory. In yet another embodiment, the first and second predetermined distances can be inputted by the user through another user interface, such as a keyboard or a touch panel.

Furthermore, during the step of obtaining the first and second directional resolutions, the movement direction of the mouse device 10 is not limited to either the first direction D1 or the second direction D2. In other words, the mouse device 10 can be moved along a direction that is inclined with respect to either the first direction D1 or the second direction D2.

Figure 6:
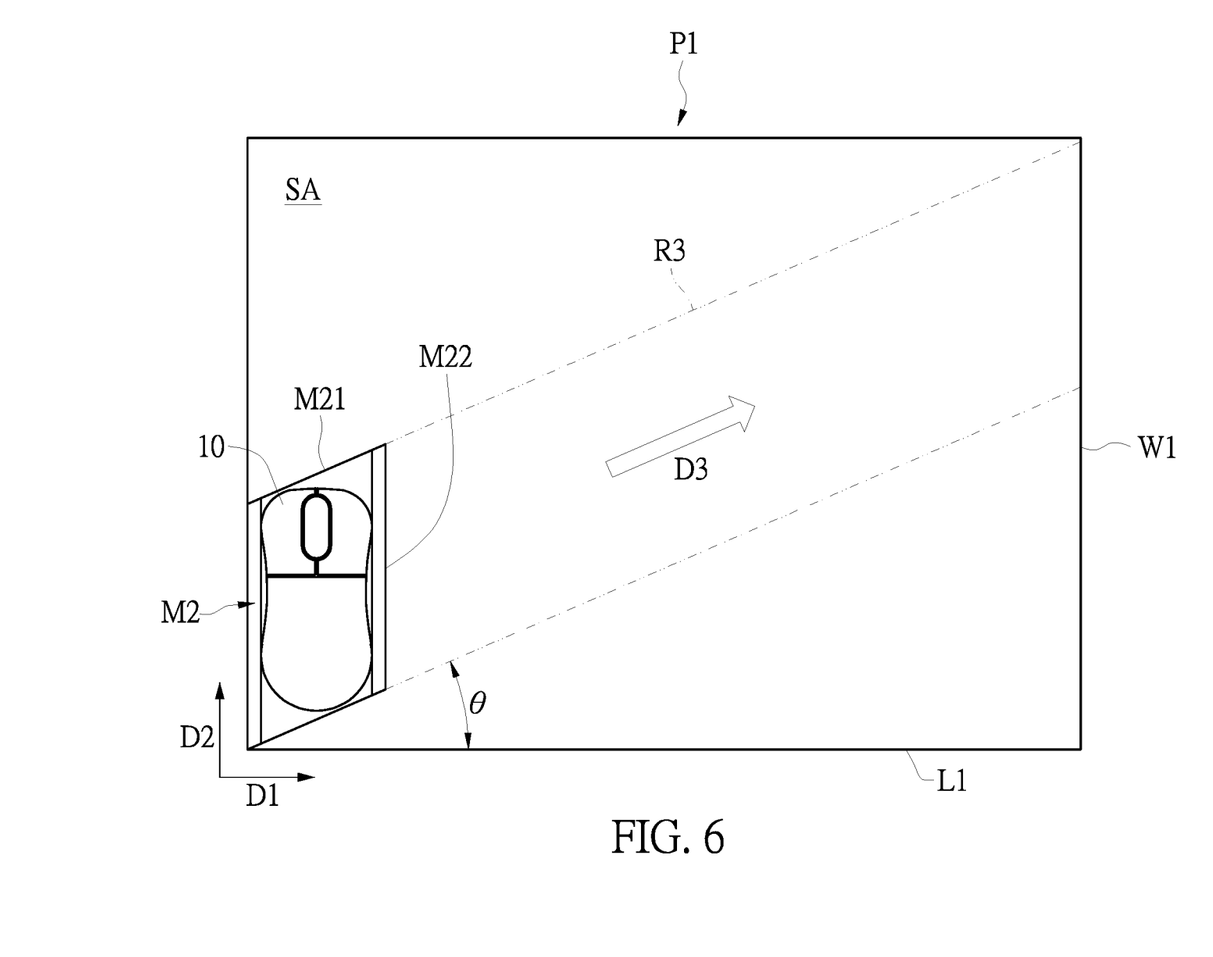
FIG. 6 is a schematic view showing the step for obtaining the first and second directional resolutions according to another embodiment of the present disclosure.

Reference is made to FIG. 6, which is a schematic view showing the step for obtaining the first and second directional resolutions according to another embodiment of the present disclosure.

In the instant embodiment, the mouse device 10 is moved along a third direction D3 that is inclined by an angle θ with respect to the horizontal direction (or the first direction D1). Specifically, the mouse device 10 is placed on the first operating surface SA of the mouse pad P1 and moved for a third predetermined distance along the third direction D3. Furthermore, when the mouse moves along the third direction that is different from the first and second directions D1, D2, the longitudinal axis of the mouse device 10 remains extended in a direction parallel to the second direction D2.

It should be noted that even though a third path R3 along which the mouse device 10 travels is inclined with respect to the first direction D1, the mouse device 10 can detect a first total count corresponding to the horizontal direction (the first direction D1) and a second total count corresponding to the vertical direction (the second direction D2).

Furthermore, in the instant embodiment, the mouse device 10 is assembled to a stabilizing member M2 so that the mouse device 10 can be held at a certain height above the first operating surface SA during the movement of the mouse device 10. It should be noted that the first edge M21 of the stabilizing member M2 is substantially parallel to the third direction D3, and a second edge M22 of the stabilizing member M2 is parallel to the second direction D2. The stabilizing member M2 can be held and moved by the user with its second edge M21 being parallel to the third direction D3, so that the mouse device 10 assembled thereto can be steadily moved along a straight line on the first operating surface SA.

Subsequently, the first directional resolution can be obtained by dividing the first total count by a horizontal displacement of the mouse device 10. Similarly, the second directional resolution can be obtained by dividing the second total count by a vertical displacement of the mouse device 10.

Both the horizontal displacement and the vertical displacement are related to the third predetermined distance and the angle θ that is formed between the third direction D3 and the horizontal direction (or the first direction D1). For example, the horizontal displacement can be calculated by multiplying the third predetermined distance by the cosine of the angle θ ($\cos θ$), and the vertical displacement can be calculated by multiplying the third predetermined distance by the sine of the angle θ ($\sin θ$).

Reference is made to FIG. 3. After the step of obtaining the first directional resolution in the first direction D1 and the second directional resolution in the second direction D2, the method proceeds to step S2, i.e., obtaining at least one calibration factor.

In the instant embodiment, for the same operating surface, more than one calibration factors respectively corresponding to different directions are obtained. For example, the calibration factors corresponding to the first operating surface SA include a first directional calibration factor and a second directional calibration factor.

The first directional calibration factor can be obtained by dividing the preset value by the first directional resolution. For example, it is assumed that the mouse device 10 is moved in the first direction D1 for the first predetermined distance of 5 inches and assumed that the mouse device 10 detects the first total count of 27000, the first directional resolution in the first direction D1 is 5400 (count per inch).

In one embodiment, the preset value is assumed to be 5000 (count per inch). That is to say, when the mouse device 10 is operated on the first operating surface SA of the mouse pad P1, the first directional resolution detected by the mouse device 10 deviates from the preset value. Accordingly, the first directional calibration factor can be calculated and determined to be 0.926 by dividing the preset value (5000 count per inch) by the first directional resolution (5400 count per inch).

Similarly, the second directional calibration factor can be obtained by dividing the preset value by the second directional resolution. The first and second directional factors can be calculated and obtained by the mouse device 10 or the host device 11.

Reference is made to FIG. 2. The method proceeds to step S3, i.e., calibrating an actual count of the mouse device according to the at least one calibration factor under the normal mode. Furthermore, the step S3 can be executed by the processor 101 of the mouse device 10 or the host device 11.

In the instant embodiment, whenever the mouse device 10 is moved on the first operating surface SA for a certain distance, a first actual count corresponding to the first direction D1 and a second actual count corresponding to the second direction D2 can be detected by the mouse device 10.

Moreover, the first actual count is calibrated by the processor 101 of the mouse device 10 before it is transmitted to the host device 11. Specifically, the processor 101 can calibrate the first actual count detected by the mouse device 10 corresponding to the first direction D1 so as to obtain a first directional calibrated count. The processor 101 calculates the first directional calibrated count by multiplying the first actual count by the first directional calibration factor.

Similarly, the second actual count detected by the mouse device 10 corresponding to the second direction D2 can be calibrated by the processor 101 so as to obtain a second directional calibrated count. That is to say, the processor 101 calculates the second directional calibrated count by multiplying the second actual count by the second directional calibration factor. The first and second directional calibrated counts can be transmitted to the host device 11, so that the host device 11 controls the movement of the cursor displayed on the display device 12 according to the first and second directional calibrated counts.

Specifically, the host device 11 controls a horizontal displacement of the cursor displayed on the display device 12 according to the first directional calibrated count, and controls a vertical displacement of the cursor displayed on the display device 12 according to the second directional calibrated count.

In another embodiment, the first actual count and the second actual count can be calibrated by the host device 11. That is to say, the host device 11 receives and then calibrates the first actual count and the second actual count by similar manners, i.e., multiplying the first actual count by the first directional calibration factor and multiplying the second actual count by the second directional calibration factor.

However, in some embodiments, the first directional calibration factor may be substantially equal to the second directional calibration factor. As such, either the steps S11, S12 or the steps S13, S14 shown in FIG. 3 can be omitted. As shown in FIG. 2 and FIG. 3, after the step S11 and the step S12 are performed, the method can directly proceed to the step S2 and the step S3.

Specifically, under the normal mode, whenever the mouse device 10 is moved on the first operating surface SA, the second actual count, which corresponds to the second direction D2 and is detected by the mouse device 10, can be calibrated according to the first directional calibration factor. That is to say, the processor 101 or the host device 11 can obtain the second directional calibrated count by multiplying the second actual count by the first directional calibration factor.

If the steps S11, S12 are omitted, the method proceeds to the step S2 and the step S3 after performing the steps S13, S14. That is to say, only the second directional calibration factor is obtained during the step S2. Furthermore, during the step S3, the first actual count corresponding to the first direction D1 can be calibrated according to the second directional calibration factor. Accordingly, the first directional calibrated count can be obtained by multiplying the first actual count by the second directional calibration factor.

Figure 7:
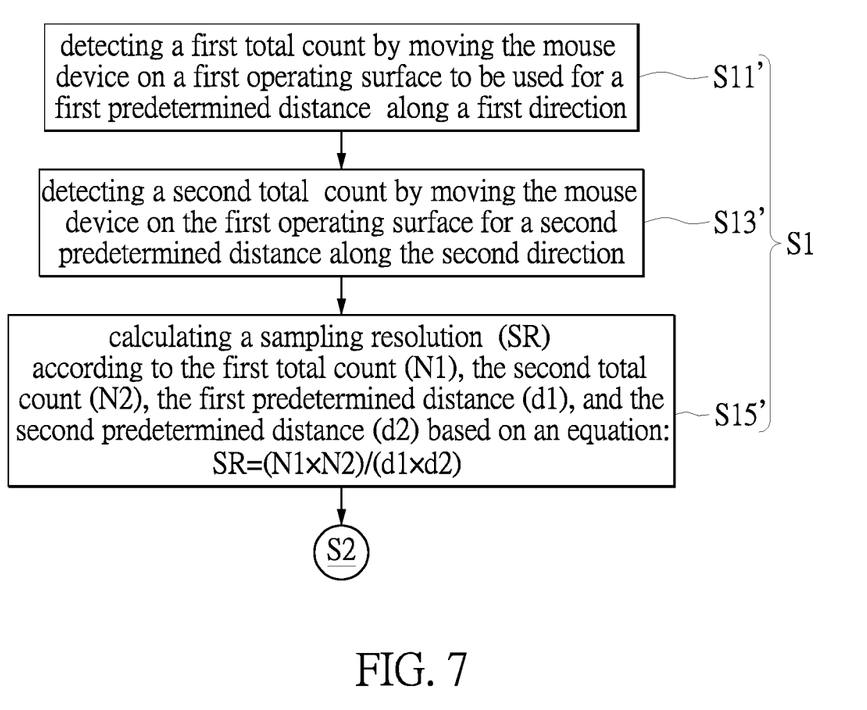
FIG. 7 is a flowchart of the step S1 for obtaining the sampling information shown in FIG. 1 according to another embodiment of the present disclosure.

Reference is made to FIG. 7, which is a flowchart of the step S1 for obtaining the sampling information shown in FIG. 1 according to another embodiment of the present disclosure.

In the instant embodiment, the step of obtaining the sampling information includes the following steps. In step S11', a first total count is detected by moving the mouse device on a first operating surface to be used for a first predetermined distance along a first direction. In step S13', a second total count is detected by moving the mouse device on the first operating surface to be used for a second predetermined distance along a second direction.

The steps of detecting the first total count and the second total count are similar to the steps S11 and S13 shown in FIG. 2. That is to say, the first total count and the second total count can be detected by moving the stabilizing member M1 (or M2) to which the mouse device 10 is assembled on the first operating surface SA of the mouse pad P1, as shown in FIGS. 4 to 6. The details of detecting the first and second total count will not be reiterated herein.

In the instant embodiment, the sampling information includes a sampling resolution. In step S15', the sampling resolution is calculated according to the first total count, the second total count, the first predetermined distance, and the second predetermined distance based on an equation: $SR=(N1+N2)/(d1+d2)$, in which SR represents the sampling resolution, N1 represents the first total count, N2 represents the second total count, d1 represents the first predetermined distance, and d2 represents the second predetermined distance.

For example, it is assumed that the mouse device 10 is moved in the first direction D1 for the first predetermined distance of 2 inches and assumed that the mouse device 10 detects the first total count of 2014. Furthermore, it is assumed that the mouse device 10 is moved in the second direction D2 for the second predetermined distance of 3 inches and assumed that the mouse device 10 detects the first total count of 3021. The sampling resolution calculated and obtained by the abovementioned equation is 1007 (count per inch).

After the step of obtaining the sampling resolution, the method proceeds to the step S2 shown in FIG. 1. That is, the calibration factor can be obtained according to the sampling information and the preset value. Specifically, in the instant embodiment, the calibration factor can be calculated by dividing the preset value by the sampling resolution. The step of obtaining the calibration factor can be performed by the mouse device 10 or the host device 11.

In one embodiment, the preset value is assumed to be 1000 (count per inch), and the calibration factor can be calculated and determined to be 0.993 by dividing the preset value (1000 count per inch) by the sampling resolution 1007 (count per inch). The method proceeds to the step S3. As mentioned previously, whenever the mouse device 10 is moved on the first operating surface SA for a certain distance, the first actual count corresponding to the horizontal direction (the first direction D1) and the second actual count corresponding to the vertical direction (the second direction D2) can be detected by the mouse device 10.

Moreover, the processor 101 or the host device 11 can calibrate the first actual count detected by the mouse device 10 and corresponding to the first direction D1 so as to obtain a first directional calibrated count. The first directional calibrated count can be calculated by multiplying the first actual count by the calibration factor that can be obtained after performing the step S15 and the step S2.

Similarly, the second actual count detected by the mouse device 10 and corresponding to the second direction D2 can be calibrated so as to obtain a second directional calibrated count. That is to say, the second directional calibrated count is calculated by multiplying the second actual count by the same calibration factor. The first and second directional calibrated counts are both obtained by the host device 11, so that the host device 11 controls the movement of the cursor displayed on the display device 12 according to the first and second directional calibrated counts.

Specifically, the host device 11 controls a horizontal displacement of the cursor displayed on the display device 12 according to the first directional calibrated count, and controls a vertical displacement of the cursor displayed on the display device 12 according to the second directional calibrated count.

Whenever the mouse device 10 is placed on different operating surfaces, the method for calibrating sensitivity of the mouse device can be performed so that the user can operate the mouse device 10 with substantially the same sensitivity.

For example, if the mouse device is operated on a second operating surface, second sampling information of the mouse device is obtained under the test mode by moving the mouse device on the second operating surface to be used. The second sampling information includes another first directional resolution in the first direction D1 and another second directional resolution in the second direction D2.

Subsequently, in step S2, another first directional calibration factor corresponding to the second operating surface can be obtained by dividing the preset value by another first directional resolution. Similarly, another second directional calibration factor corresponding to the second operating surface can be obtained by dividing the preset value by another second directional resolution. It should be noted that the values of the first directional calibration factors which respectively correspond to the first and second operating surfaces would be different since the conditions (e.g. the surface roughness) of the first operating surface may be different from that of the second operating surface. Similarly, the values of the second directional calibration factors which respectively correspond to the first and second operating surfaces would be different since the conditions (e.g. the surface roughness) of the first operating surface may be different from that of the second operating surface.

In step S3, when the mouse device 10 is operated on the second operating surface under the normal mode, the first and second actual counts detected by the mouse device 10 can be calibrated to obtain another first directional calibrated count and another second directional calibrated count.

In conclusion, one of the advantages of the present disclosure is that in the mouse device and the method for calibrating sensitivity thereof at a user end provided herein, by the technical features of "obtaining first sampling information of the mouse device by moving the mouse device on a first operating surface to be used," "obtaining a first directional calibration factor corresponding to the first operating surface by dividing the preset value by the first directional resolution," and "calibrating a first actual count of the mouse device corresponding to the first direction by multiplying the first actual count by the first directional calibration factor so as to obtain a first directional calibrated count when the mouse device is used on the first operating surface," the sensitivity of the mouse device can be easily calibrated by a user whenever the operating surface on which the mouse device is placed is changed.

That is to say, by the method for calibrating the mouse device disclosed herein, the user could avoid annoyance caused by the DPI variations resulting from different operating surfaces with different surface roughness.

Furthermore, the sensitivity of the mouse device can be calibrated by using the stabilizing member M1 (or M2). It is more convenient for a user to move the mouse device 10 by holding the stabilizing member M1 (or M2). Furthermore, the calibration accuracy of the sensitivity can be further improved due to the use of the stabilizing member M1 (or M2).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for calibrating sensitivity of a mouse device at a user end comprising:
    obtaining first sampling information of the mouse device by moving the mouse device on a first operating surface to be used, wherein the first sampling information includes a first directional resolution in a first direction;
    retrieving a preset value from a memory;
    obtaining a first directional calibration factor corresponding to the first operating surface by dividing the preset value by the first directional resolution; and
    calibrating a first actual count of the mouse device corresponding to the first direction by multiplying the first actual count by the first directional calibration factor so as to obtain a first directional calibrated count when the mouse device is used on the first operating surface.

2. The method according to claim 1, wherein the step of obtaining the first directional resolution of the mouse device includes:
   detecting a first total count by moving the mouse device for a first predetermined distance along the first direction; and
   dividing the first total count by the first predetermined distance to obtain the first directional resolution in the first direction.

3. The method according to claim 2, wherein the first predetermined distance is inputted through a user interface or retrieved from the memory.

4. The method according to claim 2, wherein the first operating surface is a surface of a mouse pad, and the step of obtaining the first directional resolution further includes:
   arranging the mouse pad to have a longer side thereof be parallel to the first direction; and
   when moved along the first direction, the mouse device is placed on the mouse pad and moved near to the longer side of the mouse pad;
   wherein the first predetermined distance corresponds to a length of the mouse pad and is stored in the memory, and the first determined distance is retrieved from the memory.

5. The method according to claim 1, further comprising:
   assembling the mouse device to a stabilizing member before the step of obtaining the first sampling information of the mouse device;
   wherein when moved, the mouse device is held at a certain height above the first operating surface by using the stabilizing member to hold the mouse device.

6. The method according to claim 1, wherein the first sampling information further includes a second directional resolution in a second direction that is not parallel to the first direction, and the method further comprises:
   dividing the preset value by the second directional resolution to obtain a second directional calibration factor; and
   calibrating a second actual count of the mouse device corresponding to the second direction by multiplying the second actual count by the second directional calibration factor so as to obtain a second directional calibrated count when the mouse device is used on the first operating surface.

7. The method according to claim 6, wherein the step of obtaining the second directional resolution of the mouse device includes:
   detecting a second total count by moving the mouse device for a second predetermined distance along the second direction; and
   dividing the second total count by the second predetermined distance to obtain the second directional resolution in the second direction.

8. The method according to claim 7, wherein the first operating surface is a surface of a mouse pad, and the step of obtaining the second directional resolution further includes:
   arranging the mouse pad to have a shorter side thereof be parallel to the second direction; and
   when moved along the second direction, the mouse device is placed on the mouse pad and moved near to the shorter side of the mouse pad;
   wherein the second predetermined distance corresponds to a width of the mouse pad and is stored in the memory, and second predetermined distance is captured from the memory.

9. The method according to claim 6, further comprising:
   obtaining second sampling information of the mouse device by moving the mouse device on a second operating surface, wherein the second sampling information includes another first directional resolution in the first direction;
   obtaining another first directional calibration factor corresponding to the second operating surface by dividing the preset value by the another first directional resolution; and
   calibrating another first actual count detected by the mouse device in the first direction by multiplying the another first actual count by the another first directional calibration factor to obtain another first directional calibrated count when the mouse device is used on the second operating surface;
   wherein the first directional calibration factor is different from the another first directional calibration factor.

10. The method according to claim 1, further comprising:
    establishing an electrical communication between the mouse device and a host device;
    wherein the step of calibrating the first actual count of the mouse device corresponding to the first direction is performed by the mouse device or the host device.

11. A method for calibrating sensitivity of a mouse device at a user end comprising:
    detecting a first total count by placing the mouse device on an operating surface to be used and moving the mouse device for a first predetermined distance along a first direction;
    detecting a second total count by placing the mouse device on the operating surface to be used and moving the mouse device for a second predetermined distance along a second direction;
    obtaining a sampling information according to the first total count, the second total count, the first predetermined distance, and the second predetermined distance, wherein the sampling information includes a sampling resolution that is calculated based on an equation:

$$SR=(N1+N2)/(d1+d2);$$

wherein SR represents the sampling resolution, N1 represents the first total count, N2 represents the second total count, d1 represents the first predetermined distance, and d2 represents the second predetermined distance;
    retrieving a preset value from a memory;
    obtaining a calibration factor by dividing the preset value by the sampling resolution; and
    calibrating a first actual count detected by the mouse device corresponding to the first direction by multiplying the first actual resolution by the calibration factor so as to obtain a first directional calibrated count when the mouse device is used on the operating surface.

12. The method according to claim 11, further comprising:
    calibrating a second actual count detected by the mouse device corresponding to the second direction by multiplying the second actual count by the calibration factor so as to obtain a second directional calibrated count when the mouse device is used on the operating surface.

13. The method according to claim 11, wherein the first predetermined distance and the second predetermined are inputted through a user interface or captured from the memory.

14. The method according to claim 13, wherein the operating surface is a surface of a mouse pad, and the method further comprises:
- arranging the mouse pad to have a longer side and a shorter side thereof be respectively parallel the first direction and the second direction;
- when moved along the first direction, the mouse device is placed on the mouse pad and moved near to the longer side of the mouse pad;
- when moved along the second direction, the mouse device is placed on the mouse pad and moved near to the shorter side of the mouse pad, and the first predetermined distance corresponding to a length of the mouse pad and the second predetermined distance corresponding to a width of the mouse pad are stored in the memory.

15. The method according to claim 11, further comprising:
- assembling the mouse device to a stabilizing member before the step of obtaining the sampling resolution of the mouse device;
- wherein when moved, the mouse device is held at a certain height by using the stabilizing member that holds the mouse device.

16. A mouse device capable of calibrating sensitivity thereof, wherein the mouse device includes:
- a memory storing a preset value;
- an optical sensor configured to obtain sampling information when the mouse device is moved on an operating surface under a test mode; and
- a processor electrically connected to the memory and the optical sensor, wherein the processor calculates at least one calibration factor according to the preset value and the sampling information;
- wherein under a normal mode, the processor calibrates an actual count by multiplying the actual count by the calibration factor, and outputs a calibrated count when the mouse device is used on the operating surface.

17. The mouse device according to claim 16, wherein the sampling information includes a first directional resolution in a first direction and a second directional resolution in a second direction that is not parallel to the first direction, the processor obtains a first directional resolution when the mouse device is moved for a first predetermined distance along the first direction, and the processor obtains a second directional resolution in a second direction when the mouse device is moved for a second predetermined distance along the second direction.

18. The mouse device according to claim 17, wherein the memory further stores the first predetermined distance corresponding to the first direction, and the second predetermined distance corresponding to a second direction.

19. The mouse device according to claim 17, wherein the processor calculates a first directional calibration factor corresponding to the first direction by dividing the preset value by the first directional resolution, and the processor calculates a second directional calibration factor corresponding to the second direction by dividing the preset value by the second directional resolution.

20. The mouse device according to claim 19, wherein the processor calibrates a first actual count corresponding to the first direction by multiplying the first actual count by the first directional calibration factor to obtain a first directional calibrated count.

21. The mouse device according to claim 20, wherein the processor calibrates a second actual count corresponding to the second direction by multiplying the second actual count by the second directional calibration factor to obtain a second directional calibrated count.

* * * * *